US008548697B2

(12) United States Patent
Ishino et al.

(10) Patent No.: US 8,548,697 B2
(45) Date of Patent: Oct. 1, 2013

(54) SHIFT CONTROL DEVICE

(75) Inventors: Toru Ishino, Saitama (JP); Satoru Sunada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 13/085,936

(22) Filed: Apr. 13, 2011

(65) Prior Publication Data

US 2011/0257852 A1    Oct. 20, 2011

(30) Foreign Application Priority Data

Apr. 15, 2010  (JP) ................. 2010-094331

(51) Int. Cl.
*G06F 7/00* (2006.01)
(52) U.S. Cl.
USPC .......................................... 701/51
(58) Field of Classification Search
USPC .................... 701/51, 53, 58, 62, 64
See application file for complete search history.

(56) References Cited

U.S. PATENT DOCUMENTS

| 4,914,594 A | 4/1990 | Sano |
| 2004/0259685 A1 | 12/2004 | Inoue et al. |
| 2010/0168956 A1* | 7/2010 | Ueno .............................. 701/34 |

FOREIGN PATENT DOCUMENTS

| EP | 2 149 472 A1 | 2/2010 |
| JP | 2005007993 A | 1/2005 |
| WO | 2010/026947 A1 | 3/2010 |

* cited by examiner

*Primary Examiner* — Kim T Nguyen
(74) *Attorney, Agent, or Firm* — Carrier Blackman & Associates, P.C.; Joseph P. Carrier; Jeffrey T. Gedeon

(57) ABSTRACT

There is provided a shift control device which is provided in a shift operation unit including: a plurality of shift positions corresponding to states of a transmission; a shift lever which selects one of the plurality of shift positions; a home position to which the shift lever automatically returns; and a shift position detecting unit which outputs a shift position signal when the shift lever is positioned in one of the plurality of shift positions, the shift control device detecting, when the shift position signal is input to the shift control device for more than a recognition time period set for the shift position where the shift lever is positioned, that the shift position is selected or that the shift operation unit has a failure, and including a deterioration state detecting unit which detects a deterioration degree of the shift operation unit, wherein the recognition time period is changed in accordance with the deterioration degree.

4 Claims, 4 Drawing Sheets

FIG.5A

Deterioration degree determination map    MP1

| Return speed | ~V1 | V1~V2 | V2~ |
|---|---|---|---|
| Deterioration degree | High | Mediate | Low |

FIG.5B

Recognition time setting map    MP2

| Deterioration degree | High | Mediate | Low |
|---|---|---|---|
| Recognition time | T1 | T2 | T3 |

SHIFT CONTROL DEVICE

CROSS REFERENCE TO RELATED APPLICATION

The application claims the foreign priority benefit under Title 35, United States Code, Section 119(a)-(d) of Japanese Patent Application No. 2010-094331 filed on Apr. 15, 2010, the content of which is hereby incorporated by reference.

BACKGROUND OF THE INVENTION

1. Field of the Invention

The present invention relates to a shift control device provided to a shift operation unit including a shift lever which automatically returns to a predetermined home position.

2. Description of the Related Arts

A vehicle which includes an automatic transmission as a transmission is provided with a shift operation unit by which the state of the transmission such as Driving (D), Reverse (D), and Neutral (N) is set in the automatic transmission. Some shift operation unit is configured such that a shift lever is automatically returned to a predetermined position (Home position) when a driver releases the shift lever after setting the state of the automatic transmission by operating the shift lever.

In such a shift operation unit, a plurality of shift positions corresponding to the states of the automatic transmission is provided on a path (shift pattern) on which the shift lever is moved. Further, the shift operation unit is configured such that when the shift lever is positioned in one of the shift positions, a shift position signal which notifies the position of the shift lever is input to a shift control device which controls the automatic transmission. The shift control device is configured such that the state of the automatic transmission is set in accordance with the input shift position signal.

A shift position corresponding to the sate of Driving (D), a shift position corresponding to the state of Reverse (D) and a shift position corresponding to the state of Neutral are respectively referred to as a D position, an R position and an N position, hereinafter. A shift position to which the shift lever is automatically returned is referred to as an H position (home position).

Although the arrangement of the shift positions is not limited, the N position which sets the automatic transmission in the Neutral state is preferably arranged in a position to which the shift lever can be directly moved from the D position, the R position and the H position in consideration of operability and convenience. Thus, a shift pattern is preferable which is made by combining a path directly connecting the N position and the D position, a path directly connecting the N position and the R position and a path directly connecting the N position and the H position. In such a shift pattern, the shift lever inevitably passes through the N position when the driver moves the shift lever to the D position or the R position from the H position. Similarly, the shift lever inevitably passes through the N position when the shift lever automatically returns from the D position or the R position to the H position (during automatic return).

If the shift control device detects that the N position is selected when the shift lever passes through the N position during the automatic return to the H position, the automatic transmission is mistakenly set to be the Neutral state during the automatic return of the shift lever.

In order to solve the problem, Unexamined Japanese Patent Application Publication No. 2005-007993 discloses a shift operation device in which a time period (recognition time period) required for the shift control ECU (shift control device) to detect the selection of the neutral position when the shift lever is positioned in the neutral position (the N position) is set longer than the recognition time period of the other shift positions.

The shift operation device (shift operation unit) disclosed in Unexamined Japanese Patent Application Publication No. 2005-007993 is configured such that the shift control ECU detects the selection of the shift position in which the shift lever is positioned when the shift lever has been held in the shift position for a time period longer than the recognition time period set for the shift position.

Since the recognition time set for the neutral position is longer than those of the other shift positions, it is possible to prevent the shift control ECU from wrongly detecting the selection of the neutral position by the shift lever when the shift lever passes through the neutral position during automatic return to the Home position.

However, due to the deterioration of the shift operation device caused by the time degradation (endurance deterioration), the moving speed (returning speed) in which the shift lever automatically returns to the Home position may become lower. If the returning speed becomes lower, the shift control ECU may determine that the shift lever has been held in the neutral position longer than the recognition time period when the shift lever automatically returning to the Home position passes through the neutral position. In this case, the shift control ECU wrongly detects that the shift lever selects the neutral position when the shift lever automatically returning to the Home position passes through the Neutral position. In order to prevent the wrong detection, the recognition time period set for the neutral position needs to be long enough.

In a configuration that the shift control device detects the failure of the shift operation device when a shift position signal notifying a shift position is continuously input to the shift control device longer than a predetermined recognition time period, when the degradation of the shift operation device is worse and the returning speed of the shift lever becomes lower, a shift position signal has been output longer than the predetermined recognition time period when the shift lever passes through the Neutral position during the automatic return. Thus, there is a disadvantage that the shift control device may wrongly detect that the shift operation device has a failure. In the shift control device configured as described above, it is preferable that the recognition time period set for the neutral position is set long enough in order to prevent the wrong detection.

In the shift operation device configured as described above, the recognition time period set for the neutral position is set longer than the recognition time period which is suitable when the deterioration degree of the shift operation device is low. Therefore, there is a problem that the shift lever needs to be held in the neutral position over a long time for setting the automatic transmission in the neutral state even when the deterioration degree of the shift operation device is low. This decreases the operability of the shift operation device.

SUMMARY OF THE INVENTION

The present invention is made in view of the above problem, and an object thereof is to provide a shift control device which can prevent the wrong detection of the failure of the shift operation unit and the selection of any shift position when the shift lever passes through the any shift position during the automatic return and which suppresses the decrease in the operability when the deterioration degree of the shift operation unit is low.

A first aspect of the present invention provides a shift control device which is provided in a shift operation unit including: a plurality of shift positions corresponding to states of a transmission; a shift lever which selects one of the plurality of shift positions; a home position to which the shift lever automatically returns; and a shift position detecting unit which outputs a shift position signal when the shift lever is positioned in one of the plurality of shift positions, the shift control device detecting, when the shift position signal is input to the shift control device for more than a recognition time period set for the shift position where the shift lever is positioned, that the shift position is selected or that the shift operation unit has a failure. The shift control device includes a deterioration state detecting unit which detects a deterioration degree of the shift operation unit, wherein the recognition time period is changed in accordance with the deterioration degree.

In accordance with the invention of the first aspect, the recognition time period needed for the shift control device to detect that the shift position where the shift lever is positioned is selected and the recognition time period needed for the shift control device to detect that the shift operation unit has a failure can be changed depending on the deterioration degree of the shift operation unit. Thus, when the deterioration degree of the shift operation unit is high, the recognition time period can be set long.

A second aspect of the present invention provides the shift control device, wherein the shift position includes at least a first shift position and a second shift position, and wherein the recognition time period set for the first shift position is changed depending on the deterioration degree when the first shift position is disposed on a path on which the shift lever moves between the home position and the second shift position.

In accordance with the second aspect of the invention, the recognition time period for the first shift position disposed on the path on which the shift lever moves between the home position and the second shift position can be changed depending on the deterioration degree of the shift operation unit. Thus, when the deterioration degree of the shift operation unit is high, the recognition time period for the first shift position can be set long.

A third aspect of the present invention provides the shift control device, wherein the recognition time period set for the first shift position when the shift lever automatically returns to the home position from the second shift position is changed depending on the deterioration degree.

In accordance with the invention of the third aspect, the recognition time period for the first shift position when the shift lever automatically returns to the home position from the second shift position can be changed depending on the deterioration degree. Therefore, when the deterioration degree of the shift operation unit is high, the recognition time period for the first shift position when the shift lever automatically returns to the home position from the second position can be set long.

A fourth aspect of the invention provides the shift control device, wherein the deterioration state detecting unit detects the deterioration degree based on an integrated time from a time when the shift operation unit starts to be used In accordance with the fourth aspect of the invention, the deterioration state detecting unit can detect the deterioration degree based on the integrated time from the operation start time of the shift operation unit.

A fifth aspect of the present invention provides the shift control device, wherein the deterioration state detecting unit detects the deterioration degree based on a return time needed for the shift lever to return to the home position from one of the plurality of shift positions automatically.

In accordance with the fifth aspect of the invention, the deterioration state detecting unit can detect the deterioration degree based on the return time needed for the shift lever to automatically return to the home position from one of the plurality of the shift positions. Thus, when the return time is long, the recognition time period can be set long.

In accordance with the present invention, a shift control device is provided which enables to prevent the wrong detection of the selection of the shift position by the shift lever or the wrong detection of the malfunction of the shift operation unit when the shift lever passes the shift position during its automatic return, and to prevent the decrease in the operability of the shift operation unit.

BRIEF DESCRIPTION OF THE DRAWINGS

FIG. 5A is a view showing an example of a deterioration degree determination map.

FIG. 5B is a view showing an example of a recognition time period setting map.

DETAILED DESCRIPTION OF THE PREFERRED EMBODIMENTS

An embodiment of the present invention is described in detail below, referring to the accompanying drawings. A shift operation unit 1 according to the embodiment shown in FIG. 1 is mounted on a vehicle (not shown) for setting the state of an automatic transmission 1b (see FIG. 2), which is provided as a transmission.

Figure 1:
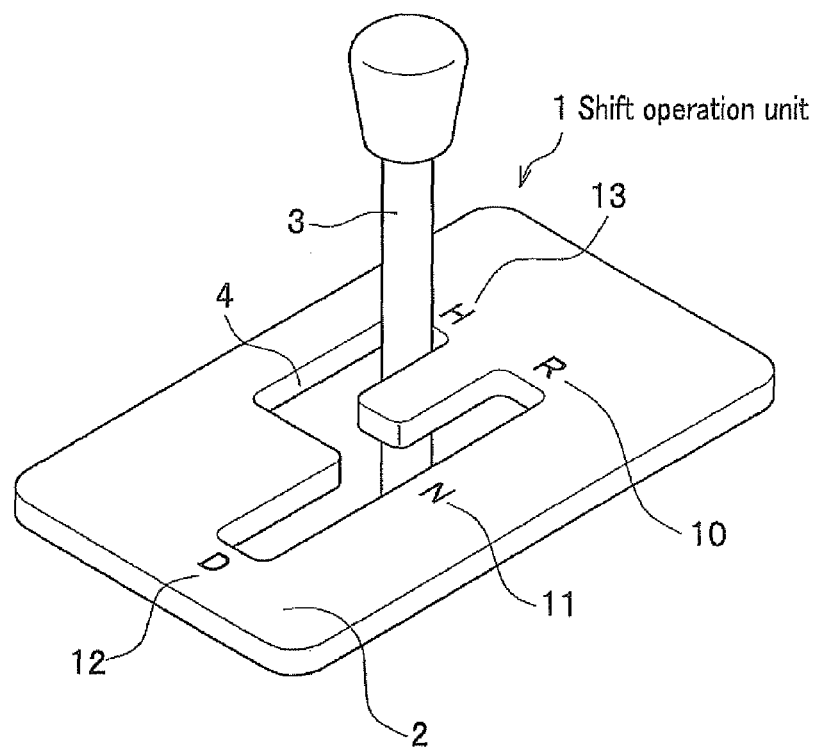
FIG. 1 is a perspective view showing a shift operation unit according to an embodiment of the present invention.

As shown in FIG. 1, the shift operation unit 1 includes a plurality of shift positions (R position 10, N position 11, D position 12) and a shift lever 3 which selects one of the plurality of shift positions. As described above, each of the shift positions corresponds to a state of the automatic transmission 1b. More specifically, the R position 10 corresponds to the reverse state, the N position 11 corresponds to the neutral state, and the D position 12 corresponds to the driving state.

The automatic transmission 1b (see FIG. 2) may include a gear transmission mechanism or a belt transmission mechanism, and the type of the automatic transmission 1b is not limited.

The shift lever 3 is provided such that the shift lever 3 can move along a shift pattern 4 which is formed in the form of gate grooves on a panel 2 covering an internal structure. The driver operates the shift lever 3 to select one of the shift positions. The shift lever 3 according to the embodiment is configured such that the shift lever 3 automatically returns to a predetermined position when the driver releases the shift lever 3 after operating the shift lever 3. The predetermined position to which the shift lever 3 automatically returns is referred to as the Home position (H position 13).

The arrangement of each shift positions and the H position 13 is not limited, however, it is preferable that the N position 11 is arranged in a position to which the shift lever 3 can be directly moved from the R position 10, the D position 12 and the H position 13, as described above. For example, it is preferable that the R position 10, the N position 11 and the D position 12 are arranged in a row along the gate groove provided in a longitudinal direction.

Further, the gate groove arranged in the lateral direction is branched perpendicularly from the N position 11 of the gate groove arranged in the longitudinal direction. The laterally-arranged gate groove is then bent in a longitudinal direction, and the H position 13 is arranged on a distal end of the bent gate groove.

With this arrangement, the N position 11 is arranged on a path on which the shift lever 3 is moved between the H position 13 and the D position 12. Similarly, the N position 11 is arranged on a path on which the shift lever 3 moves between the H position 13 and the R position 10. If the D position 12 is assumed to correspond to a second shift position, the N position 11 corresponds to a first shift position.

Further, as described above, the shift operation unit 1 according to the embodiment is configured such that the shift lever 3 is automatically returned to the H position 13. More specifically, if the driver moves the shift lever 3 to any of shift positions (the R position 10, the N position 11 and the D position 12) other than the H position 13 and releases the shift lever 3, the shift lever 3 is automatically returned to the H position 13 by an automatic return mechanism (not shown) which is comprised of a return spring. An automatic return mechanism by which the shift lever 3 is automatically returned to the H position 13 may employ a known technique, and thus the detailed description thereof is omitted.

The shift operation unit 1 is configured to electrically detect the shift positions or the H position 13 in which the shift lever 3 is positioned since the shift lever 3 automatically returns to the H position 13 as described above.

Figure 2:
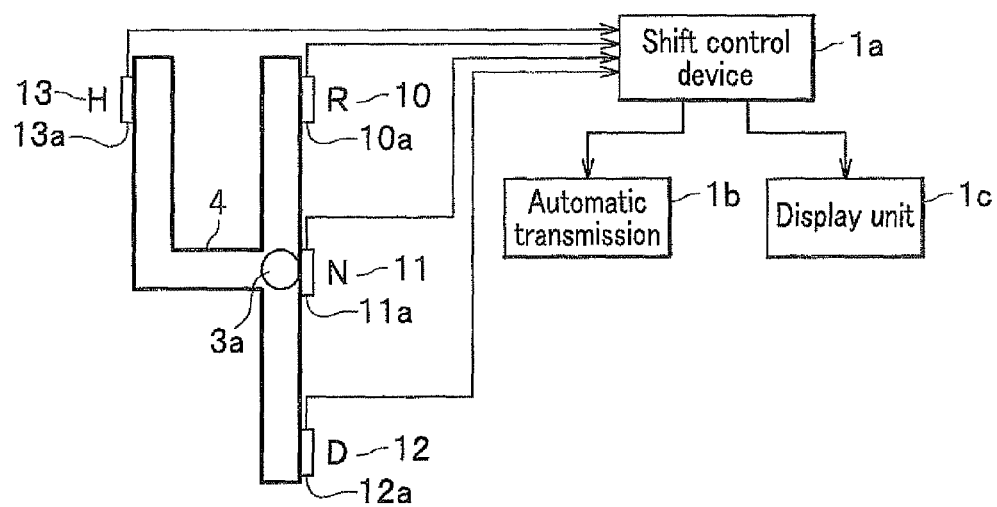
FIG. 2 is a view showing electrodes disposed at positions corresponding to shift positions.

As shown in FIG. 2, for example, an R electrode 10a, an N electrode 11a, a D electrode 12a and an H electrode 13a are provided in positions corresponding to the R position 10, the N position 11, the D position 12 and the H position 13, respectively. The shift operation unit 1 is configured such that when the shift lever 3 is positioned in one of the shift positions, one of the electrodes (the R electrode 10a, the N electrode 11a and the D electrode 12a) corresponding to the one of the shift position comes in contact with a lever side electrode 3a provided in the shift lever 3. Similarly, the shift operation unit 1 is configured such that when the shift lever 3 is positioned in the H position 13, the H electrode 13a comes in contact with the lever side electrode 3a. For example, when the shift lever 3 is positioned in the N position 11, the lever side electrode 3a and the N electrode 11a come in contact with each other.

In a configuration where the R electrode 10a, the N electrode 11a, the D electrode 12a and the H electrode 13a are electrically connected to the shift control device 1a which controls the automatic transmission 1b and an electric signal for detecting the position of the shift lever 3 (referred to as a shift position signal, hereinafter) is supplied to the lever side electrode 3a from a signal generator (not shown), the shift position signal supplied to the lever side electrode 3a can be input to the shift control device 1a through one of the R electrode 10a, the N electrode 11a, the D electrode 12a and the H electrode 13a.

The shift control device 1a identifies an electrode through which the shift position signal is input to identify the electrode with which the lever side electrode 3a is in contact. Thus, the shift control device can detect the shift position or the H position 13 in which the shift lever is positioned. The shift position in which the shift lever 3 is positioned is a selected shift position selected by the shift lever 3. The shift control device 1a can detect by the shift position signal that the shift position where the shift lever 3 is positioned is selected.

As described above, the shift operation unit 1 (see FIG. 1) according to the embodiment includes the lever side electrode 3a, the R electrode 10a, the N electrode 11a and the D electrode 12a, and when the shift lever 3 is positioned in one of these shift positions, the shift position signal is output to be input to the shift control device 1a. The lever side electrode 3a, the R electrode 10a, the N electrode 11a and the D electrode 12a are comprised of a shift position detection unit described in claims.

The shift control device 1a controls the automatic transmission 1b based on a shift position selected by the shift lever 3. For example, when a shift position signal is input to the shift control device 1a through the N electrode 11a, the shift control device 1a determines that the N position 11 is selected by the shift lever 3 and sets the automatic transmission 1b in a neutral state.

If the shift control device 1a is configured to display a shift position selected by the shift lever 3 on a display part 1c, the driver can check the shift position selected by the shift lever 3 by the indication on the display part 1c.

In a case where the shift control device 1a detects the selection of the shift position where the shift lever 3 is positioned, it is preferable to configure that the shift control device 1a detects the selection of the shift position where the shift lever 3 is positioned when a shift position signal is continued to be input to the shift control device 1a for more than a predetermined time period in order to prevent the wrong detection due to a noise and chattering. Hereinafter, the requisite time period for which the shift position signal is continuously input for the shift control device 1a to determine the selection of the shift position where the shift lever 3 is positioned is referred to as a recognition time period.

The recognition time period is a unique time period which is set independently for each of the R position 10, the N position 11 and the D position 12. The shift control device 1a is configured to detect the selection of a shift position where the shift lever 3 is positioned when the shift position signal is continuously input for more than the set recognition time period. For example, conventionally, the recognition time periods of 0.2 second are set for the R position 10 and the D position 12, and the recognition time period of more than 1.5 second is set for the N position 11. In short, the shift control device 1a detects the selection of the R position 10 or the D position 12 when the shift position signal is continuously input for more than 0.2 second. On the other hand, the shift control device 1a detects the selection of the N position 11 when the shift position signal is continuously input for more than 1.5 second.

In the shift operation unit 1 according to the embodiment, the shift pattern 4 is formed such that the shift lever 3 passes through the N position 11 when the shift lever 3 automatically returns to the H position 13 from the R position 10 or the D position 12 (i.e. during automatic return). As the time period for which the shift position signal is input to the shift control device 1a through the N electrode 11a when the shift lever 3 passes the N position 11 during its automatic return is measured to be 0.8 second, the recognition time period for the N position 11 is set to be more than 0.8 second. With this configuration, it is possible to prevent the shift control device 1a from wrongly detecting the selection of the N position 11 when the shift lever 3 passes the N position 11 during its automatic return. Accordingly, it is also possible to prevent the automatic transmission 1b from wrongly being set to be the neutral state when the shift lever 3 automatically returns to the H position 13.

If the returning speed of the shift lever 3 becomes low when the shift lever 3 automatically returns to the H position due to the deterioration of the automatic return mechanism (i.e. the deterioration of the shift operation unit 1) caused by the time degradation of the return spring and the lubricant oil which are used in an automatic return mechanism (not shown), the time period for which the shift position signal is continuously input to the shift control device 1a through the N electrode 11a may exceed 0.8 second when the shift lever 3 passes the N position 11 during its automatic return. Thus, taking the decrease of the returning speed of the shift lever 3 into consideration, the recognition time period of the N position 11 is set to be 1.5 seconds. With this configuration, even if the returning speed of the shift lever 3 is decreased, it is possible to prevent the shift control device 1a from wrongly detecting that the N position 11 is selected when the shift lever 3 passes the N position 11 during its automatic return.

However, if the recognition time period for the N position 11 is set to be 1.5 seconds, the driver needs to keep the shift lever 3 in the N position 11 for more than or equal to 1.5 seconds when the driver wishes to set the automatic transmission 1b in the neutral state by the operation of the shift lever 3. Thus, the operability of the shift operation unit 1 is decreased. For example, as the recognition time period for the N position 11, which would be sufficient to be set as 0.8 seconds when the deterioration degree of the shift operation unit 1 is low, is set to be 1.5 seconds, the operability of the shift operation unit 1 is decreased.

In the shift control device 1a according to the embodiment, the recognition time period set for the N position 11 is changed preferably depending on the deterioration degree of the shift operation unit 1. Thus, it is possible to prevent the shift control device 1a from wrongly detecting that the N position 11 is selected when the shift lever 3 passes the N position 11 during its automatic return. It is also possible to prevent the decrease in the operability of the shift operation unit 1 when the deterioration degree of the shift operation unit 1 is low.

Figure 3:
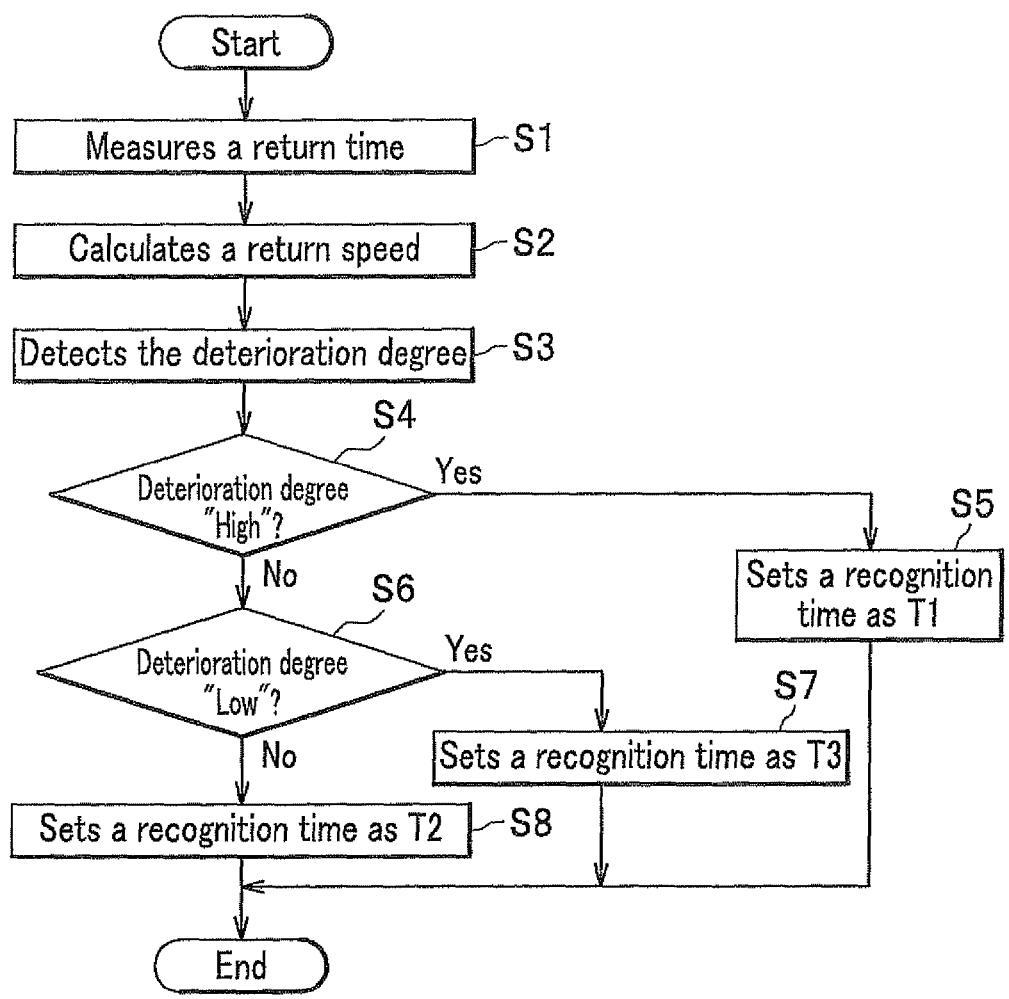
FIG. 3 is a flow chart showing a process performed by a shift control device to change the recognition time period set for the N position.

Hereinafter, the process executed by the shift control device 1a to change the recognition time period set for the N position 11 is explained with reference to FIG. 3 (see FIGS. 1 and 2 as appropriate). The process is incorporated in a program executed by the shift control device 1a and is executed when the shift lever 3 is positioned in the R position 10 or the D position 12 by the operation of the driver.

At first, the shift control device 1a detects the deterioration degree of the shift operation unit 1. A method performed by the shift control device 1a to detect the deterioration degree of the shift operation unit 1 is not limited. In the embodiment, the shift control device 1a detects the deterioration degree of the shift operation unit 1 based on the time taken for the shift lever 3 to return to the H position 13 from the D position 12 or the R position 10. Thus, the shift control device 1a measures the return time period when the shift lever 3 automatically returns to the Home position (step S1). More specifically, the shift control device 1a measures the return time period required for the shift lever 3 to automatically return from the R position 10 to the H position 13, or the return time period taken for the shift lever 3 to automatically return from the D position 12 to the H position 13. The shift control device 1a then calculates the returning speed based on the measured return time period (step S2).

Figure 4A:
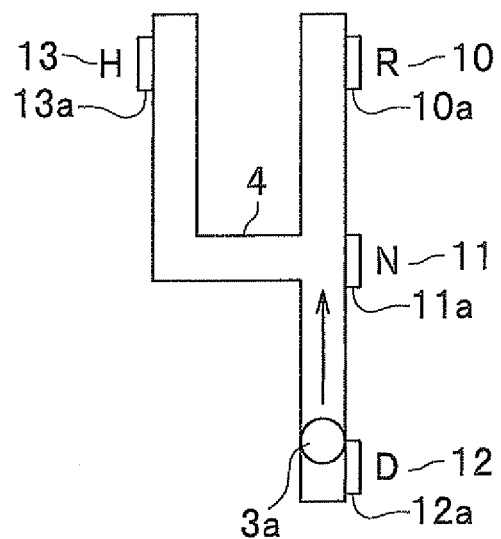
FIG. 4A is a view showing an operation of a lever side electrode when the shift lever automatically returns from the D position to the H position.
Figure 4B:
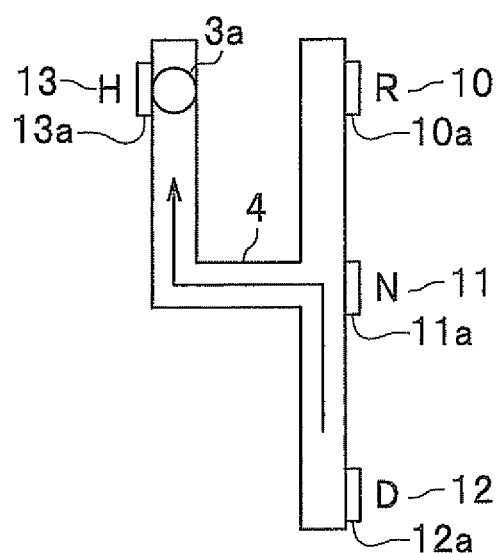
FIG. 4B is a view showing the operation of the lever side electrode when the shift lever automatically returns from the D position to the H position.

For example, when the shift control device 1a measures the return time period taken for the shift lever 3 to return to the H position 13 from the D position 12, the shift control device 1a starts an incorporated timer, setting as an initial state the time when the shift lever 3 is moved from the D position as shown in FIG. 4A, the lever side electrode 3a is not in contact with the D electrode 12a and the input of the shift position signal is stopped. The shift control device 1a measures the time period from the initial state to the time when the lever side electrode 3a comes in contact with the H electrode 13a of the H position 13 as shown in FIG. 4B, and the shift position signal starts to be input through the H electrode 13a. The time period measured as described above is the return time period.

Similarly, the shift control device 1a can measure the return time period when the shift lever 3 automatically returns from the R position 10 to the H position 13.

In a case where the return time period taken for the shift lever 3 to return from the D position 12 to the H position 13 is measured, the shift control device 1a can calculate the return speed by dividing the measured return time period by the path length from the D position 12 to the H position 13. Similarly, by dividing the return time period from the R position 10 to the H position 13 by the path length from the R position 10 to the H position 13, the return speed can be measured. The path length from the D position 12 to the H position 13 and the path length from the R position 10 to the H position 13 are values predetermined (fixed values) as a design value of the shift operation unit 1.

As described above, as the return speed is decreased in accordance with the deterioration degree of the shift operation unit 1, the shift control device 1a according to the embodiment detects the deterioration degree of the shift operation unit 1 based on the calculated return time period (return speed) (step S3). As described above, the shift control device 1a in the embodiment includes a function of detecting the deterioration degree of the shift operation unit 1 and corresponds to "a deterioration degree detection unit" described in claims.

For example, if the relationship between the return speed and the deterioration degree is determined in advance and is stored in the storing unit (not shown) as a deterioration degree determination map MP1 as shown in FIG. 5A, the shift control device 1a can detect the deterioration degree of the shift operation unit 1 according to the calculated return speed by referring to the deterioration degree determination map MP1.

When the three steps of the deterioration degree, Low, Mediate and High, are used, two speed threshold values V1, V2 (V1<V2) are set as shown in the deterioration degree determination map MP1 shown in FIG. 5A. When the calculated return speed is equal to or lower than the speed threshold value V1, the shift control device 1a determines that the deterioration degree of the shift operation unit 1 is high and the return speed is low, detecting that the deterioration degree is High by referring to the deterioration degree determination map MP1. When the calculated return speed is equal to or more than the speed threshold value V2, the shift control device 1a determines that the deterioration degree of the shift operation unit 1 is low and the return speed is maintained to be High, detecting that the deterioration degree is Low by referring to the deterioration degree determination map MP1. Further, when the calculated return speed is more than the speed threshold value V1 and is lower than the speed threshold value V2, the shift control device 1a detects that the deterioration degree is "Mediate" by referring to the deterioration degree determination map MP1. These speed threshold values V1, V2 are characteristic values which are set based on experiments or the like as a value used for preferably changing the recognition time period set for the N position 11.

After detecting the deterioration degree of the shift operation unit 1 (step S3), the shift control device 1a sets the recognition time period for the N position 11 in accordance with the deterioration degree of the shift operation unit 1. For example, if the relationship between the deterioration degree and the recognition time period is determined in advance and the relationship is stored in a storage unit (not shown) as a recognition time period setting map MP2 shown in FIG. 5B, the shift control device 1a can set the recognition time period for the N position 11 in accordance with the detected deterioration degree by referring to the recognition time period setting map MP2. The recognition time period setting map MP2 is set by an experiment or the like.

For example, if the recognition time period in the case where the deterioration degree of the shift operation unit 1 is High is set to be T1, the recognition time period in a case where the deterioration degree of the shift operation unit 1 is Mediate is set to be T2, and the recognition time period in a case where the deterioration degree is Low is set to be T3 as shown in the recognition time period setting map MP2 shown in FIG. 5B, it is preferable to make the relationship among T1, T2 and T3 to be T1>T2>T3. When the shift lever 3 passes the N position 11 during its automatic return in a case where the deterioration degree is High and the return speed is low, the time period for which the lever side electrode 3a and the N electrode 11a are in contact with each other becomes long and the time period for which the shift position signal is input to the shift control device 1a through the N electrode 11a also becomes long. Therefore, in order to prevent the shift control device 1a from detecting the selection of the N position 11 when the shift lever 8 passes the N position 11 during its automatic return, the recognition time period for the N position 11 is set longer.

On the other hand, when the shift lever 3 passes the N position 11 during its automatic return in a case where the deterioration degree of the shift operation unit 1 is Low and the return speed is high, the time period for which the lever side electrode 3a and the N electrode 11a are in contact with each other is short and the time period for which the shift position signal is input to the shift control device 1a through the N electrode 11a is also short. Therefore, even if the recognition time period of the N position 11 is set to be short, the shift control device 1a does not detect the selection of the N position 11 when the shift lever 3 passes the N position 11 during its automatic return. By setting the recognition time period for the N position 11 short, an excellent operability can be realized. More specifically, since the time period for which the driver keeps the shift lever 3 in the N position 11 is short when setting the automatic transmission 1b to be the neutral state, an excellent operability can be realized.

Such recognition time periods T1, T2, T3 are time periods determined such that the shift control device 1a does not detect the selection of the N position 11 when the shift lever 3 passes the N position 11 during its automatic return. The recognition time periods T1, T2, T3 are characteristic values which are determined based on the operability or a configuration required for the shift operation unit 1. In the above example, T1 and T3 may be set as 1.5 seconds and 0.8 seconds, respectively, and T2 may be set as a value between T1 (1.5 seconds) and T3 (0.8 second), e.g. 1.0 second. However, T1, T2, T3 are not limited to these values.

The shift control device 1a refers to the recognition time period setting map MP2 based on the deterioration degree detected in step S3. When the deterioration degree is "High" (step S4→Yes), the longest recognition time period T1 is set in the recognition time period for the N position 11 (step S5). When the deterioration degree is not "High", (step S4→No) and the deterioration degree is "Low" (step S6→Yes), the shift control device 1a sets the shortest recognition time period T3 in the recognition time period for the N position 11 (step S7).

Further, when the deterioration degree is not "Low" (step S6→No), the shift control device 1a sets the recognition time period T2 in the recognition time period for the N position 11 (step S8).

With this configuration, when the shift lever 3 automatically returns from the D position 12 or the R position 10 to the H position 13, the recognition time period set for the N position 11 can be modified in accordance with the deterioration degree of the shift operation unit 1. Therefore, when the shift lever 3 passes the N position 11 during its automatic return, it is possible to prevent the shift control device 1a from wrongly detecting that the N position 11 is selected.

The shift control device 1a controls the automatic transmission 1b at the set recognition time period. More specifically, the shift control device 1a detects that the N position 11 where the shift lever 3 is positioned is selected when the shift position signal is continuously input through the N electrode 11a for more than the set recognition time period. Then, the shift control device 1a sets the automatic transmission 1b in the neutral state.

As described above, the shift control device 1a (see FIG. 2) according to the embodiment is characterized in that the recognition time period set for the N position 11 is changed depending on the deterioration degree of the shift operation unit 1 (see FIG. 1). When the deterioration degree of the shift operation unit 1 is "Low", the recognition time period for the N position 11 is set shorter in order to obtain a good operability. When the deterioration degree of the shift operation unit 1 is "High", the shift control device 1a sets the recognition time period for the N position 11 to be long so that the shift control device 1a is prevented from wrongly detecting the selection of the N position 11 when the shift lever 3 (see FIG. 1) passes the N position 11 during its automatic return.

Thus, the shift control device 1a according to the embodiment can be prevented from wrongly detecting that the N position 11 is selected when the shift lever 3 passes the N position 11 during its automatic return. Further, an excellent operability can be obtained when the deterioration degree of the shift operation unit 1 is low.

The present embodiment can be modified appropriately without deviating from the spirit of the present invention.

The shift control device 1a (see FIG. 2) according to the embodiment change the recognition time period set for the N position 11 depending on the deterioration degree of the shift operation unit 1 (see FIG. 1). For example, the shift control device 1a may be configured to change the recognition time period for the N position 11 only when the shift lever 3 (see FIG. 1) is positioned in the D position 12 or the R position 10. With this configuration, the recognition time period set for the N position 11 can be changed only when the shift lever 3 automatically returns to the H position. Thus, even if the deterioration degree of the shift operation unit 1 is High, the recognition time period for the N position 11 can be set short when the shift lever 3 is positioned in the H position 13, whereby the decrease in the operability of the shift operation unit 1 can be prevented when the driver moves the shift lever 3 from the H position 13 to the N position 11.

For example, the shift lever 3 (see FIG. 1) may be provided with a sensor such as a touch sensor which detects that the driver is in contact with the shift lever 3, and the shift control device 1a (see FIG. 2) may detect the deterioration degree only when the sensor detects that the driver detects is not in contact with the shift lever 3. When the driver is in contact with the shift lever 3, the return time measured by the shift control device 1a is not an accurate value. Therefore, with this configuration, it is possible to prevent the detection of the deterioration degree when an accurate return time can not be measured. In other words, the detection of the deterioration degree based on an inaccurate return time can be prevented.

In the embodiment, the shift control device 1a (see FIG. 2) according to the embodiment detects the deterioration degree of the shift operation unit 1 (see FIG. 1) according to the return time (return speed) when the shift lever 3 (see FIG. 1) automatically returns from the R position 10 or the D position 12 to the H position 13, however, the deterioration degree may be detected based on an integrated time from the time when the shift operation unit 1 is started to be used. In this case, the shift control device 1a may be configured to detect the deterioration degree to be High as the integrated time of the shift operation unit 1 is long and set the recognition time period for the N position 11 long.

The shift operation unit 1 (see FIG. 1) may be configured to measure or estimate the degree of viscosity of the lubricant in an automatic return mechanism (not shown) and to make the shift control device 1a (see FIG. 2) detect the deterioration degree of the shift operation unit 1 in accordance with the degree of viscosity of the lubricant. In this case, the shift control device 1a may be configured to set the recognition time period for the N position 11 long as the degree of the viscosity of the lubricant is high.

The deterioration degree of the shift operation unit 1 (see FIG. 1) is not limited to the three steps of "High", "Mediate" and "Low" represented in the deterioration degree determination map MP1 shown in FIG. 5B, and may be two steps or four steps or more. In this case, speed threshold values and the recognition time periods for determining the deterioration degree may be set in accordance with the steps of the deterioration degree. Alternatively, the deterioration degree may be set in nonstop in accordance with the decrease in the return speed. In this case, the recognition time period may be configured to be set in nonstep in accordance with the deterioration degree.

The embodiment of the present invention can be applied to the shift control device 1a which is configured to detect the malfunction of the shift operation unit 1 (see FIG. 1) when the shift position signal is continuously input to the shift control device 1a (see FIG. 2) for more than the recognition time period. In this case, when the deterioration degree of the shift operation unit 1 is low, the recognition time period for the N position 11 (see FIG. 1) is set to be 2.0 seconds for example. When the deterioration degree of the shift operation unit 1 is high, the recognition time period for the N position 11 is set to be 3.0 seconds, for example.

With this configuration, even when the deterioration degree of the shift operation unit 1 is high, the return time taken for the shift lever 3 to return from the D position 12 (see FIG. 1) to the H position 13 (see FIG. 1) during its automatic return is long, and the shift position signal is continuously output for more than 2.0 seconds when the shift lever 3 passes the N position 11 (see FIG. 1) during its automatic return, the shift control device 1a does not determine that the shift operation unit 1 has a failure. Thus, the shift control device 1a can be prevented from wrongly detecting the malfunction of the shift operation unit 1.

What is claimed is:

1. A shift control device which is provided in a shift operation unit comprising:
 a plurality of shift positions corresponding to states of a transmission;
 a shift lever which selects one of the plurality of shift positions;
 a home position to which the shift lever automatically returns; and
 a shift position detecting unit which outputs a shift position signal when the shift lever is positioned in one of the plurality of shift positions, wherein
   the shift control device detecting, when the shift position signal is input to the shift control device for more than a preset recognition time period for the shift position where the shift lever is positioned, that the shift position is selected or that the shift operation unit has a failure, and wherein
 the shift control device measures a return time taken for the shift lever to return to the home position from any one of the plurality of the shift positions and changes the preset recognition time period based on the measured return time.

2. The shift control device according to claim 1, wherein the shift position includes at least a first shift position and a second shift position, and wherein
 the recognition time period set for the first shift position is changed depending on the return time when the first shift position is disposed on a path on which the shift lever moves between the home position and the second shift position.

3. The shift control device according to claim 2, wherein the recognition time period set for the first shift position when the shift lever automatically returns to the home position from the second shift position is changed depending on the return time.

4. The shift control device according to claim 1, further comprising a sensor which detects whether a driver is in contact with the shift lever, and wherein
 the shift control device measures the return time when the sensor detects that the driver is not in contact with the shift lever.

* * * * *